US011824238B2

(12) United States Patent
Stanescu et al.

(10) Patent No.: US 11,824,238 B2
(45) Date of Patent: Nov. 21, 2023

(54) SYSTEM FOR MANAGING HYDROGEN UTILIZATION IN A FUEL CELL POWER PLANT

(71) Applicant: DOOSAN FUEL CELL AMERICA, INC., South Windsor, CT (US)

(72) Inventors: Ioana Stanescu, Manchester, CT (US); Joshua Preston, South Windsor, CT (US); Paul Margiott, South Windsor, CT (US)

(73) Assignee: HYAXIOM, INC., East Hartford, CT (US)

( * ) Notice: Subject to any disclaimer, the term of this patent is extended or adjusted under 35 U.S.C. 154(b) by 0 days.

(21) Appl. No.: 16/398,524

(22) Filed: Apr. 30, 2019

(65) Prior Publication Data

US 2020/0350605 A1 Nov. 5, 2020

(51) Int. Cl.
*H01M 8/0444* (2016.01)
*H01M 8/04746* (2016.01)
*H01M 8/04089* (2016.01)
*H01M 8/04791* (2016.01)

(52) U.S. Cl.
CPC ... *H01M 8/04462* (2013.01); *H01M 8/04089* (2013.01); *H01M 8/04447* (2013.01); *H01M 8/04798* (2013.01)

(58) Field of Classification Search
CPC ......... H01M 8/04462; H01M 8/04089; H01M 8/04798; H01M 8/04447
USPC ......................................................... 429/443
See application file for complete search history.

(56) References Cited

U.S. PATENT DOCUMENTS

| | | | |
|---|---|---|---|
| 4,025,412 A * | 5/1977 | LaConti | G01N 27/4045 204/424 |
| 4,051,006 A | 9/1977 | Neti et al. | |
| 4,731,211 A | 3/1988 | Lee | |
| 4,766,044 A * | 8/1988 | Sederquist | H01M 8/04097 429/471 |
| 4,859,305 A | 8/1989 | Schneider et al. | |
| 4,859,307 A | 8/1989 | Nishizawa et al. | |
| 4,895,775 A | 1/1990 | Kato et al. | |

(Continued)

FOREIGN PATENT DOCUMENTS

CN 207558943 U 6/2018
JP H05275097 A 10/1993
(Continued)

OTHER PUBLICATIONS

Cosa+Xentaur, Continuous Hydrogen Analyzer, 2004 COSA Instrument Corporation.

(Continued)

*Primary Examiner* — Christian Roldan
(74) *Attorney, Agent, or Firm* — Carlson, Gaskey & Olds, P.C.

(57) ABSTRACT

An illustrative example system for managing hydrogen utilization in a fuel cell power plant includes a first hydrogen concentration sensor that provides an indication of a first concentration of hydrogen in a fluid flowing into an anode inlet of the power plant. A second hydrogen concentration sensor provides an indication of a second concentration of hydrogen in a fluid flowing out of an anode exit of the power plant. A processor determines a utilization of hydrogen by the power plant based on the first and second concentrations.

20 Claims, 2 Drawing Sheets

(56) References Cited

U.S. PATENT DOCUMENTS

| | | | |
|---|---|---|---|
| 5,547,554 A | 8/1996 | Kiesele | |
| 5,667,653 A | 9/1997 | Schneider et al. | |
| 5,668,302 A | 9/1997 | Finbow et al. | |
| 6,168,705 B1 | 1/2001 | Molter et al. | |
| 6,280,865 B1 | 8/2001 | Eisman et al. | |
| 6,368,735 B1 * | 4/2002 | Lomax | H01M 8/0662 429/442 |
| 6,376,124 B1 | 4/2002 | Dodgson et al. | |
| 6,455,181 B1 * | 9/2002 | Hallum | H01M 8/04089 429/423 |
| 6,506,296 B2 | 1/2003 | Babes-Dornea et al. | |
| 6,558,519 B1 | 5/2003 | Dodgson et al. | |
| 6,638,416 B2 | 10/2003 | Wang et al. | |
| 6,645,361 B1 | 11/2003 | Bloemer et al. | |
| 6,977,121 B2 | 12/2005 | Balliet et al. | |
| 6,984,464 B2 | 1/2006 | Margiott et al. | |
| 8,298,712 B2 | 10/2012 | Stirakawa | |
| 8,747,635 B2 | 6/2014 | Murakami et al. | |
| 8,771,490 B2 * | 7/2014 | Bordo | G01N 27/406 204/431 |
| 8,840,775 B2 | 9/2014 | Chen et al. | |
| 8,932,772 B2 | 1/2015 | Kumei et al. | |
| 9,410,919 B2 | 8/2016 | Spong et al. | |
| 10,062,915 B2 | 8/2018 | Paganelli | |
| 2001/0051290 A1 * | 12/2001 | Kashiwagi | H01M 8/04738 429/9 |
| 2002/0092780 A1 | 7/2002 | Nadanami et al. | |
| 2003/0077495 A1 * | 4/2003 | Scartozzi | H01M 8/04671 429/513 |
| 2003/0158273 A1 * | 8/2003 | Kosako | H01M 8/1039 429/510 |
| 2004/0028967 A1 | 2/2004 | Katsuki et al. | |
| 2004/0182705 A1 | 9/2004 | Ishikawa et al. | |
| 2004/0197621 A1 * | 10/2004 | Balliet | H01M 8/04462 429/427 |
| 2004/0261500 A1 | 12/2004 | Ng et al. | |
| 2005/0042485 A1 * | 2/2005 | Murayama | H01M 8/04089 429/444 |
| 2005/0153180 A1 * | 7/2005 | Hsu | H01M 8/2457 429/432 |
| 2005/0181262 A1 | 8/2005 | Vanderleeden et al. | |
| 2005/0214603 A1 * | 9/2005 | Barton | H01M 8/04462 429/415 |
| 2006/0032742 A1 | 2/2006 | Babes-Dornea et al. | |
| 2006/0073373 A1 | 4/2006 | Andrin et al. | |
| 2008/0145722 A1 | 6/2008 | Coignet et al. | |
| 2008/0179199 A1 | 7/2008 | Coignet et al. | |
| 2008/0223516 A1 * | 9/2008 | Tanuma | H01M 4/8828 429/494 |
| 2009/0004551 A1 | 1/2009 | Burdzy et al. | |
| 2009/0136793 A1 | 5/2009 | Kanno | |
| 2009/0166197 A1 | 7/2009 | Grincourt et al. | |
| 2009/0291342 A1 * | 11/2009 | Tezuka | H01M 8/04231 429/441 |
| 2010/0028730 A1 * | 2/2010 | Ghezel-Ayagh | H01M 8/04014 429/444 |
| 2011/0151345 A1 | 6/2011 | Lundblad et al. | |
| 2014/0251834 A1 | 9/2014 | Chen et al. | |
| 2014/0311905 A1 | 10/2014 | Stetter et al. | |
| 2016/0171797 A1 * | 6/2016 | Kim | B60W 50/02 701/29.2 |
| 2017/0025692 A1 | 1/2017 | Zhang et al. | |

FOREIGN PATENT DOCUMENTS

| | | | |
|---|---|---|---|
| JP | 2000131273 | | 5/2000 |
| JP | 2000131273 A | | 5/2000 |
| JP | 20000131273 | * | 5/2000 |
| JP | 2005332610 | | 12/2005 |
| JP | 2005332610 A | | 12/2005 |
| JP | 2009217951 A | | 9/2009 |
| JP | 2014199233 A | | 10/2014 |
| JP | 2015144092 | | 8/2015 |
| JP | 2015144092 A | | 8/2015 |
| WO | 9409520 | | 4/1994 |
| WO | WO2008048270 A1 | | 4/2008 |
| WO | 2011008898 A2 | | 1/2011 |
| WO | 2018/209082 A1 | | 5/2017 |
| WO | 2019/073850 A1 | | 4/2019 |

OTHER PUBLICATIONS

International Search Report and Written Opinion of the International Searching Authority for PCT Application No. PCT/2020/027136 dated Jul. 28, 2020.
The International Search Report and Written Opinion for PCT Application No. PCT/US2019/059768, dated Jan. 21, 2020.
International Preliminary Report on Patentability for International application No. PCT/US2020/027136 dated Nov. 11, 2021.
International Search Report and Written Opinion of the International Searching Authority for International application No. PCT/US2021/058217 dated Feb. 8, 2022.
International Search Report and Written Opinion of the International Searching Authority for International application No. PCT/US2021/058186 dated Feb. 8, 2022.
Notice of Preliminary Rejection, Korean Patent Application No. 10-2021-7018973 dated May 31, 2023.
International Preliminary Report on Patentability for International application No. PCT/US2021/058217 dated Jun. 22, 2023.
International Preliminary Report on Patentability for International application No. PCT/US2021/058186 dated Jun. 22, 2023.

* cited by examiner

SYSTEM FOR MANAGING HYDROGEN UTILIZATION IN A FUEL CELL POWER PLANT

BACKGROUND

Fuel cell power plants are useful as primary or back up power sources. Each power plant typically includes several cell stack assemblies that each include many fuel cells. One issue associated with fuel cell power plant operation is providing the anodes of the respective cell stack assemblies with sufficient hydrogen to avoid a fuel starvation condition. One known technique for avoiding potential fuel starvation includes using gas chromatography to measure hydrogen associated with the cell stack assemblies as part of the assembly or installation procedures. One drawback to this approach includes requiring additional time and labor, which contributes to the cost of the system. This approach is also not able to account for variations in fuel usage or hydrogen utilization over time, which occurs in most power plants.

SUMMARY

An illustrative example system for managing hydrogen utilization in a fuel cell power plant includes a first hydrogen concentration sensor that provides an indication of a first concentration of hydrogen in a fluid flowing into an anode inlet of the power plant. A second hydrogen concentration sensor provides an indication of a second concentration of hydrogen in a fluid flowing out of an anode exit of the power plant. A processor determines a utilization of hydrogen by the power plant based on the first and second concentrations.

In an example embodiment having one or more features of the system of the previous paragraph, the processor determines whether the utilization of hydrogen is within a preselected range and provides an output when the utilization is outside the preselected range.

In an example embodiment having one or more features of the system of any of the previous paragraphs, the output comprises an alarm indicating fuel starvation if the utilization is above a threshold percentage.

In an example embodiment having one or more features of the system of any of the previous paragraphs, the preselected range is based on a power output of the power plant.

In an example embodiment having one or more features of the system of any of the previous paragraphs, the processor determines the utilization of hydrogen by the power plant based on a formula: (first concentration−second concentration)/(first concentration×(1−second concentration)).

An example embodiment having one or more features of the system of any of the previous paragraphs includes at least one third hydrogen concentration sensor that provides an indication of a third concentration of hydrogen associated with anodes of at least one cell stack assembly within the power plant and wherein the processor determines a utilization of hydrogen by the at least one cell stack assembly based on the first and third concentrations.

In an example embodiment having one or more features of the system of any of the previous paragraphs, the at least one third hydrogen concentration sensor comprises a plurality of third hydrogen concentration sensors that provide indications of the third concentration associated with respective cell stack assemblies of the power plant and the processor determines a utilization of hydrogen by each of the cell stack assemblies.

An illustrative example fuel cell power plant includes the system of any of the previous paragraphs and the processor controls an amount of fuel provided to the anode inlet of the power plant based on the utilization.

An example embodiment having one or more features of the system of any of the previous paragraphs includes a fuel reformer and wherein the processor controls operation of the fuel reformer based on the utilization.

In an example embodiment having one or more features of the system of any of the previous paragraphs, the processor increases an amount of hydrogen provided to the anode inlet of the power plant when the utilization is above a preselected range.

In an example embodiment having one or more features of the system of any of the previous paragraphs, the processor shuts down the power plant when the utilization of hydrogen by the power plant is outside the preselected range.

An illustrative example method of managing hydrogen utilization in a fuel cell power plant includes determining a first concentration of hydrogen in a fluid flowing into an anode inlet of the power plant, determining a second concentration of hydrogen in a fluid flowing out of an anode exit of the power plant, and determining a utilization of hydrogen by the power plant based on the first and second concentrations.

In an example embodiment having one or more features of the method of the previous paragraph, the first concentration is determined based on an indication from a first hydrogen concentration sensor situated to sense hydrogen in the fluid flowing into the anode inlet of the power plant and the second concentration is determined based on an indication from a second hydrogen concentration sensor situated to sense hydrogen in the fluid flowing out of the anode exit of the power plant.

An example embodiment having one or more features of the method of any of the previous paragraphs includes determining whether the utilization of hydrogen is within a preselected range and providing an output at least when the utilization is outside the preselected range.

In an example embodiment having one or more features of the method of any of the previous paragraphs, the output comprises an alarm indicating fuel starvation if the utilization is above a threshold percentage.

An example embodiment having one or more features of the method of any of the previous paragraphs includes determining a third concentration of hydrogen associated with anodes of at least one cell stack assembly within the power plant and determining a utilization of hydrogen by the at least one cell stack assembly based on the first and third concentrations.

In an example embodiment having one or more features of the method of any of the previous paragraphs, determining the utilization of hydrogen by the power plant is based on a formula: (first concentration−second concentration)/(first concentration×(1−second concentration)).

An example embodiment having one or more features of the method of any of the previous paragraphs includes controlling an amount of fuel provided to the anode inlet of the power plant based on the utilization.

An example embodiment having one or more features of the method of any of the previous paragraphs includes controlling operation of a fuel reformer of the power plant based on the utilization.

An example embodiment having one or more features of the method of any of the previous paragraphs includes shutting down the power plant when the utilization of hydrogen by the power plant is outside the preselected range.

Various features and advantages of at least one disclosed example embodiment will become apparent to those skilled in the art from the following detailed description. The drawings that accompany the detailed description can be briefly described as follows.

DETAILED DESCRIPTION

Figure 1:
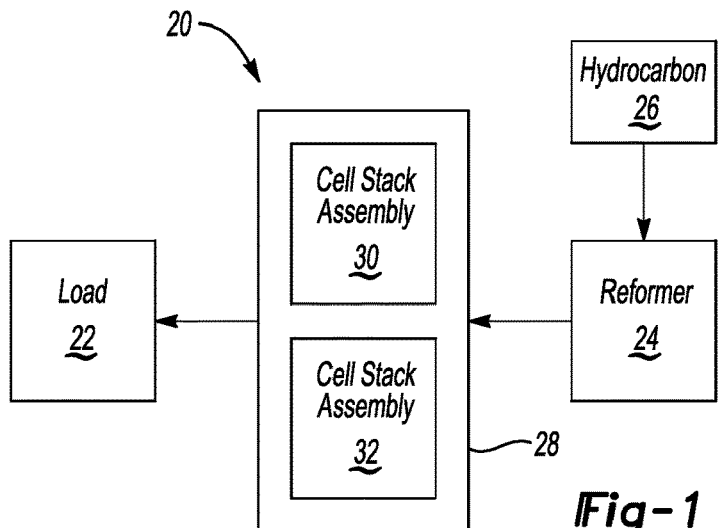
FIG. 1 schematically illustrates an example fuel cell power plant.

FIG. 1 schematically illustrates selected features of a fuel cell power plant 20 that provides electrical power to a load 22. A reformer 24 processes a hydrocarbon 26, such as methane or natural gas. The reformer 24 produces a hydrogen fuel that is supplied to a power generating portion 28 of the power plant 20. The hydrogen fuel is one of the reactants used by fuel cell stack assemblies 30 and 32 that produce electricity based on an electrochemical reaction in a known manner.

Figure 2:
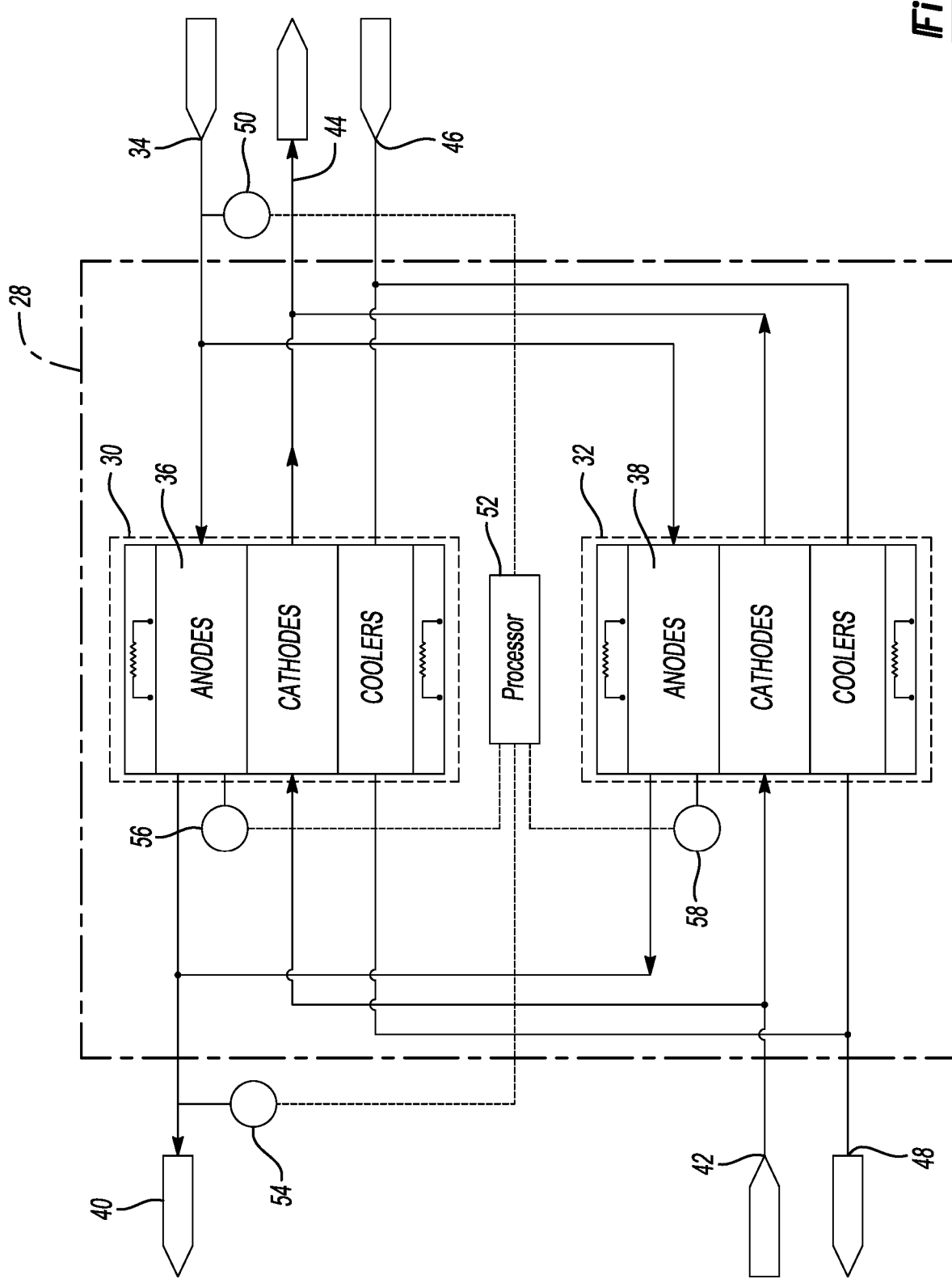
FIG. 2 schematically illustrates selected features of the example fuel cell power plant.

FIG. 2 schematically illustrates selected features of the power generating portion 28 of the power plant 20. The hydrogen fuel from the reformer 24 flows through an anode inlet 34 to supply hydrogen to the anodes 36 of the cell stack assembly 30 and the anodes 38 of the cell stack assembly 32. Exhaust fluid from the anodes 36 and 38 flows out of an anode exit 40 of the power plant 20. Oxygen is provided to the cathodes of the cell stack assemblies 30 and 32 through a cathode inlet 42. Fluid exiting the cathodes passes through a cathode exit 44. The illustrated example includes coolers for each of the cell stack assemblies 30 and 32. A coolant inlet 46 supplies coolant fluid to the coolers and a coolant exit 48 directs used coolant where it can be recirculated, for example.

A first hydrogen concentration sensor 50 is situated to detect a hydrogen concentration in the fluid flowing through the anode inlet 34. The exact position of the first hydrogen concentration sensor may vary depending on the configuration of the power plant. In some embodiments, the first hydrogen concentration sensor is situated in an inlet pipe that feeds into the individual manifold inlets of the power plant.

The first hydrogen concentration sensor 50 provides an indication of the concentration of hydrogen in the fluid flowing through the anode inlet 34 to a processor 52. The processor 52 includes at least one computing device and memory.

A second hydrogen concentration sensor 54 provides an indication of a concentration of hydrogen in the fluid flowing through the anode exit 40. The exact location of the second hydrogen concentration sensor may vary depending on the configuration of the power plant provided that the indication corresponds to the hydrogen concentration at the outlet or anode exit 40. The processor 52 receives the indication from the second hydrogen concentration sensor 54.

A third hydrogen concentration sensor 56 is associated with the anodes 36 of the cell stack assembly 30. In an example embodiment, the third hydrogen concentration sensor 56 is situated to provide an indication of a concentration of hydrogen in fluid exhausted from the anodes 36. Another third hydrogen concentration sensor 58 is associated with the anodes 38 of the cell stack assembly 32. The hydrogen concentration sensor 58 provides an indication of a concentration of hydrogen in fluid exhausted by the anodes 38. In some embodiments, the third hydrogen concentration sensors 56, 58 are strategically placed in the manifold or at the manifold outlet of the respective stack to provide an indication of the hydrogen concentration of a sensitive one of the cell stack assemblies or a sensitive portion of such a stack. The processor 52 receives the hydrogen concentration indications from the third hydrogen concentration sensors 56 and 58.

The processor 52 manages hydrogen utilization by the power plant 20 and within the cell stack assemblies 30 and 32. The processor 52 in this example is capable of monitoring and managing the hydrogen utilization of individual cell stack assemblies within the power generating portion 28 of the power plant 20. Managing hydrogen utilization according to an embodiment consistent with this description allows for more efficient or complete use of the fuel. The example processor 52 actively manages bulk hydrogen utilization for the power plant 20 and hydrogen utilization by the cell stack assemblies 30, 32. Actively managing the hydrogen utilization avoids providing significantly more hydrogen than is needed while simultaneously avoiding a fuel starvation condition. Providing too much hydrogen is considered inefficient and providing too little increases the risk of fuel starvation. The disclosed example embodiment balances those two considerations.

Figure 3:
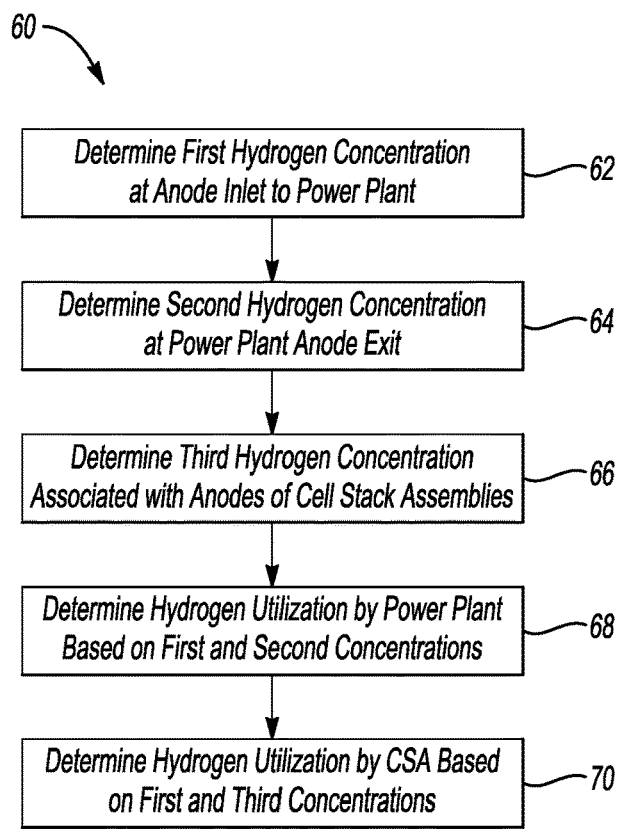
FIG. 3 is a flow chart diagram summarizing an example method of managing hydrogen utilization in a fuel cell power plant.

FIG. 3 is a flowchart diagram 60 that summarizes an example approach. At 62, the processor 52 determines the first hydrogen concentration at the power plant anode inlet 34 based on the indication from the first hydrogen concentration sensor 50. At 64, the processor 52 determines a second hydrogen concentration at the power plant anode exit 40 based on the indication from the second hydrogen concentration sensor 54.

At 66, the processor 52 determines a third hydrogen concentration associated with the anodes 36, 38 of the respective cell stack assemblies 30 and 32.

At 68, the processor 52 determines hydrogen utilization by the power plant 20 based on the first concentration and the second concentration. In an example embodiment, the hydrogen utilization by the power plant 20 is a percentage determined by the processor 52 based on the formula: 100×(first concentration−second concentration)/(first concentration×(1−second concentration)).

At 70, the processor 52 determines hydrogen utilization by the respective cell stack assemblies 30, 32 based on the first and respective third concentrations. In an example embodiment, the processor 52 determines the respective cell stack assembly hydrogen utilization as a percentage using the formula: 100×(first concentration−third concentration)/(first concentration×(1−third concentration)).

The hydrogen utilization information allows the processor 52 to control operation of the power plant 20, individual cell stack assemblies 30, 32, the reformer 24, or a combination of them to ensure desired power plant operation. In an example embodiment, the processor 52 determines when conditions exist that may be associated with or be a result of fuel starvation experienced by one or more of the cell stack assemblies. For example, the processor 52 has predetermined relationships between power outputs of the power plant 20 and hydrogen utilization percentages that correspond to desired operation. When the actual hydrogen utilization is outside of a predetermined or preselected range for a given power output, the processor 52 in some embodiments provides an alert or alarm output regarding the condition and adjusts operation of at least a portion of the power plant 20 to attempt to bring the hydrogen utilization back within an acceptable range.

For example, a hydrogen utilization range between 79% and 81% is considered acceptable when the power plant 20 output is on the order of 400 to 500 kilowatts. When the output is on the order of 250 kilowatts or lower, an acceptable hydrogen utilization range is between 72% and 81%.

In the event that the hydrogen utilization is too high, the processor 52 causes a change in operation of the reformer 24 to increase the supply of hydrogen to the cell stack assemblies to avoid a fuel starve event. For example, whenever the hydrogen utilization is greater than 90% over a period of time that is statistically significant, which is predetermined, the processor 52 generates an output that is issued as an alarm or indication to authorized personnel regarding the condition of the power plant 20. The processor 52 may also automatically implement control procedures to adjust the power output or the amount of fuel provided to the cell stack assemblies. In some examples, the processor 52 will shut down the power plant or one or more cell stack assemblies when the hydrogen utilization conditions satisfy a set of predetermined criteria.

Figure 4:
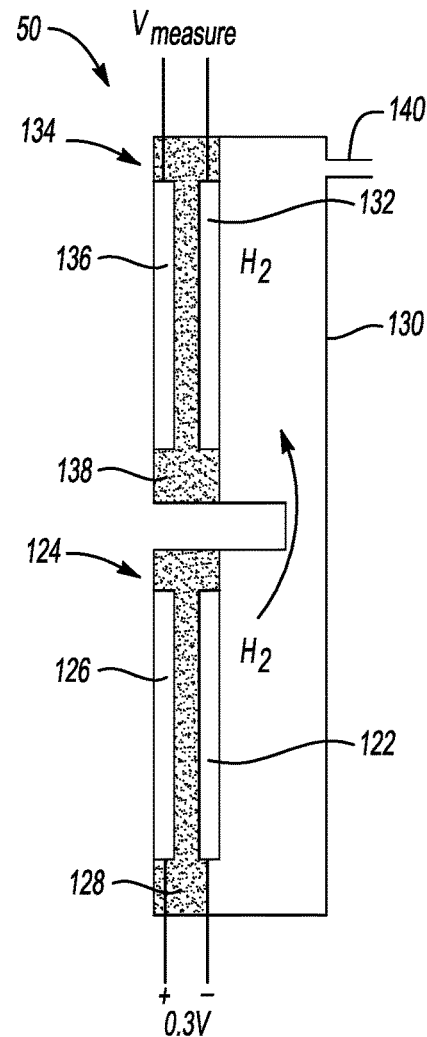
FIG. 4 schematically shows an example hydrogen concentration sensor.

The hydrogen concentration sensors 50, 54, 56 and 58 may be realized using a variety of different sensor types. One example embodiment includes a hydrogen concentration sensor as shown in FIG. 4. For discussion purposes, the hydrogen concentration sensor 50 is shown in FIG. 4.

As shown in FIG. 4, a hydrogen evolving electrode 122 is part of a first electrochemical cell 124 that also includes a hydrogen oxidizing electrode 126 and a matrix 128. In this example, the matrix 128 contains a liquid electrolyte, such as phosphoric acid. The hydrogen evolving electrode 122 introduces pure hydrogen into a hydrogen chamber 130 when a voltage is applied across the hydrogen oxidizing electrode 126 and the hydrogen evolving electrode 122. In the illustrated example the applied voltage is approximately 0.3 volts.

A reference electrode 132 is situated to be exposed to the pure hydrogen in the hydrogen chamber 130. The reference electrode 132 is part of a second electrochemical cell 134 that also includes a detection electrode 136 and a matrix 138. The matrix 138 in this example also contains a liquid electrolyte, such as phosphoric acid.

The detection electrode 136 is exposed to the fluid of interest outside the hydrogen chamber 130, such as the fluid flowing through the power plant anode inlet 34, and provides an indication of a concentration of hydrogen in that fluid. The illustrated example embodiment utilizes the known Nernst Potential phenomenon as a basis for determining the hydrogen concentration outside of the hydrogen chamber 130. A potential difference (i.e., a voltage) across the detection electrode 136 and the reference electrode 132 provides an indication of the concentration of hydrogen in the fluid of interest.

In the illustrated example, the hydrogen oxidizing electrode 126 and the detection electrode 136 are exposed to the same fluid, such as the fuel from the reformer 26. At least some hydrogen from that gas is introduced into the hydrogen chamber 130 by the hydrogen evolving electrode 122. The first electrochemical cell 124 reduces protons based on the hydrogen oxidizing electrode 126 being exposed to the fluid outside the hydrogen chamber 130. The hydrogen oxidizing electrode 126 has a size and position relative to the detection electrode 136 that does not alter the hydrogen concentration in the fluid near the detection electrode 136 to avoid skewing the hydrogen concentration measured by the sensor 50.

In the illustrated example, the pure hydrogen in the hydrogen chamber 130 is kept from mixing with fluid outside the hydrogen chamber 130 by positive pressure within the hydrogen chamber 130. The hydrogen evolving electrode 122 introduces a positive pressure within the hydrogen chamber 130. The size of the hydrogen evolving electrode 122, the amount of pure hydrogen introduced into the hydrogen chamber 130 over time, or both is selectable to provide a desired level of positive pressure within the hydrogen chamber 130.

The example hydrogen chamber 130 includes a vent 140 that allows pure hydrogen to exit the hydrogen chamber 130. The positive pressure within the hydrogen chamber 130 prevents any fluid outside the hydrogen chamber 130 from entering the chamber 130.

One feature of the illustrated example hydrogen concentration sensor 50 is that the reference electrode 132 is distinct from the hydrogen evolving electrode 122. Using the hydrogen evolving electrode 122 to provide the pure hydrogen that keeps the reference electrode 132 at a desired reference potential avoids any need to apply current to the reference electrode. This feature eliminates any shifts in the reference potential that would otherwise occur if the reference electrode 132 were used to evolve pure hydrogen. Having the reference electrode 132 exposed to only pure hydrogen in the hydrogen chamber 130 also ensures a desired potential resulting from the exposure of the reference electrode 132 to the pure hydrogen.

Other sensor configurations may be used for any or all of the hydrogen concentration sensors shown in FIG. 2 and discussed above.

One feature of the example embodiment hydrogen utilization management system and technique is that it allows for more effectively and efficiently using fuel within a fuel cell power plant. It is possible, for example, to have a higher fuel utilization level while still avoiding fuel starvation events. By knowing the hydrogen utilization on an ongoing basis, it is possible to adjust the performance of the reformer 24, the operation or output of the cell stack assemblies 30,32, or both to maintain an acceptable utilization percentage while avoiding fuel starvation. This provides a significant advance over arrangements that preset a fuel utilization target during installation of a power plant because the utilization changes over time. In order to compensate for such changes, preset operating conditions include a margin of error to accommodate situations that would otherwise result in a fuel starvation event. That margin of error results in under-utilization in some circumstances. With the ongoing monitoring and managing capabilities provided by the illustrated example, better utilization becomes possible and power plant life can be extended because the risk of fuel starvation is reduced or eliminated.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell power plant, comprising:
a plurality of cell stack assemblies each including a plurality of fuel cells comprising anodes and cathodes;

a power plant anode inlet configured for carrying fuel toward the anodes of the plurality of fuel cells of the plurality of cell stack assemblies;

a power plant anode outlet configured for carrying fluid away from the anodes of the plurality of fuel cells of the plurality of cell stack assemblies;

a first hydrogen concentration sensor configured to provide an indication of a first concentration of hydrogen in a fluid flowing into the power plant anode inlet;

a second hydrogen concentration sensor configured to provide an indication of a second concentration of hydrogen in a fluid flowing out of the power plant anode outlet;

at least one third hydrogen concentration sensor configured to provide an indication of a third concentration of hydrogen associated with the anodes of the plurality of fuel cells of at least one of the plurality of cell stack assemblies; and a processor configured to determine:
a utilization of hydrogen by the fuel cell power plant based on the first concentration of hydrogen and the second concentration of hydrogen,
a utilization of hydrogen by the at least one of the plurality of cell stack assemblies based on the first concentration of hydrogen and the third concentration, and
whether the utilization of hydrogen by the fuel cell power plant and the utilization of hydrogen by the at least one of the plurality of cell stack assemblies are respectively within a preselected range, wherein the processor is configured to provide an indication at least when at least one of the utilization of hydrogen by the fuel cell power plant and the utilization of hydrogen by the at least one of the cell stack assemblies is outside the preselected range, wherein the preselected range is based on at least one predetermined relationship between a power output of the fuel cell power plant and hydrogen utilization.

2. The fuel cell power plant of claim 1, wherein the indication comprises an alarm indicating fuel starvation if the at least one of the utilization of hydrogen by the fuel cell power plant and the utilization of hydrogen by the at least one of the plurality of cell stack assemblies is above a threshold percentage.

3. The fuel cell power plant of claim 1, wherein
the processor determines the utilization of hydrogen by the fuel cell power plant based on the formula: (first concentration of hydrogen−second concentration of hydrogen)/(first concentration of hydrogen×(1−second concentration of hydrogen)); and
the processor determines the utilization of hydrogen by the at least one of the plurality of cell stack assemblies based on the formula: (first concentration of hydrogen−third concentration of hydrogen)/(first concentration of hydrogen×(1−third concentration of hydrogen)).

4. The fuel cell power plant of claim 1, wherein the at least one third hydrogen concentration sensor is configured to provide an indication of the third concentration of hydrogen from an anode outlet of the at least one of the plurality of cell stack assemblies.

5. The fuel cell power plant of claim 1, comprising a plurality of third hydrogen concentration sensors associated with the plurality of cell stack assemblies, wherein the plurality of third hydrogen concentration sensors are each configured to provide an indication of the third concentration of hydrogen of one of the plurality of cell stack assemblies; and wherein the processor determines a utilization of hydrogen by each of the plurality of cell stack assemblies based on respective indications from the plurality of third hydrogen concentration sensors.

6. The fuel cell power plant of claim 1, wherein the processor controls an amount of fuel containing hydrogen provided to the power plant anode inlet based on at least one of the utilizations of hydrogen.

7. The fuel cell power plant of claim 6, comprising a fuel reformer and wherein the processor controls operation of the fuel reformer based on at least one of the utilizations of hydrogen.

8. The fuel cell power plant of claim 6, wherein the processor increases an amount of fuel containing hydrogen provided to the power plant anode inlet when at least one of the utilizations of hydrogen is above a preselected range.

9. The fuel cell power plant of claim 1, wherein
the processor shuts down the at least one of the plurality of cell stack assemblies when the utilization of hydrogen by the at least one of the plurality of cell stack assemblies is outside a preselected range; and
the processor shuts down the power plant when the utilization of hydrogen by the power plant is outside a preselected range.

10. The fuel cell power plant of claim 1, wherein each hydrogen concentration sensor comprises:
a hydrogen chamber configured to isolate hydrogen within the hydrogen chamber from a gas outside the hydrogen chamber;
a hydrogen evolving electrode configured to generate pure hydrogen within the hydrogen chamber;
a reference electrode configured to be exposed to pure hydrogen within the hydrogen chamber; and
a detection electrode associated with the reference electrode, the detection electrode being configured to be exposed to the gas outside the hydrogen chamber, the detection electrode being further configured to provide an indication of a concentration of hydrogen in the gas outside the hydrogen chamber.

11. The fuel cell power plant of claim 10, wherein the hydrogen evolving electrode introduces a positive pressure within the hydrogen chamber.

12. The fuel cell power plant of claim 11, wherein
the hydrogen chamber comprises a vent; and
the positive pressure within the hydrogen chamber prevents the gas outside the hydrogen chamber from entering the hydrogen chamber through the vent.

13. The fuel cell power plant of claim 10, wherein
the hydrogen evolving electrode is part of a first electrochemical cell; and
the reference electrode and the detection electrode are part of a second electrochemical cell.

14. The fuel cell power plant of claim 13, wherein
the first electrochemical cell comprises a first matrix containing an electrolyte;
the first electrochemical cell comprises a hydrogen oxidizing electrode;
the first matrix is at least partially situated between the hydrogen oxidizing electrode and the hydrogen evolving electrode; and
a voltage is applied across the hydrogen evolving electrode and the hydrogen oxidizing electrode.

15. The fuel cell power plant of claim 14, wherein
the second electrochemical cell includes a second matrix containing an electrolyte;
the second matrix is at least partially situated between the reference electrode and the detection electrode; and a voltage across the reference electrode and the detection electrode provides the indication of the concentration of hydrogen in the gas outside the hydrogen chamber.

16. The fuel cell power plant of claim 15, wherein the electrolyte in the first matrix and the electrolyte in the second matrix each comprise phosphoric acid.

17. The fuel cell power plant of claim 1, wherein the first hydrogen concentration sensor is positioned within the fluid flowing into the power plant anode inlet and the second hydrogen concentration sensor is positioned within the fluid flowing out of the power plant anode exit.

18. The fuel cell power plant of claim 10, wherein no current passes at the reference electrode.

19. The fuel cell power plant of claim 1, wherein the at least one predetermined relationship indicates that the utilization of hydrogen by the fuel cell power plant between 79% and 81% is acceptable when the power output of the fuel cell power plant is between 400 and 500 kilowatts.

20. The fuel cell power plant of claim 1, wherein the at least one predetermined relationship indicates that the utilization of hydrogen by the fuel cell power plant between 72% and 81% is acceptable when the power output of the fuel cell power plant is 250 kilowatts or lower.

* * * * *